VIDEO SIGNAL PROCESSING CIRCUIT

Filed May 1, 1967 2 Sheets-Sheet 1

Inventor
Dirk de Weger
By James E. Tracy
Attorney

May 26, 1970 D. DE WEGER 3,514,533

VIDEO SIGNAL PROCESSING CIRCUIT

Filed May 1, 1967 2 Sheets-Sheet 2

Inventor
Dirk de Weger
By James E. Tracy
Attorney

United States Patent Office 3,514,533

Patented May 26, 1970

3,514,533

VIDEO SIGNAL PROCESSING CIRCUIT

Dirk de Weger, Lombard, Ill., assignor to Zenith Radio Corporation, Chicago, Ill., a corporation of Delaware Filed May 1, 1967, Ser. No. 635,028
Int. Cl. H04n *5/38, 5/44*
U.S. Cl. 178—7.1 12 Claims

ABSTRACT OF THE DISCLOSURE

Blanking components are introduced into a video signal during its retrace intervals, and at the same time unwanted signal variations during those intervals are removed, by rendering conductive in alternation a pair of signal translating channels one of which supplies the video signal to a common load circuit while the other channel applies to the same load circuit a blanking potential at any desired level.

Figure 1:
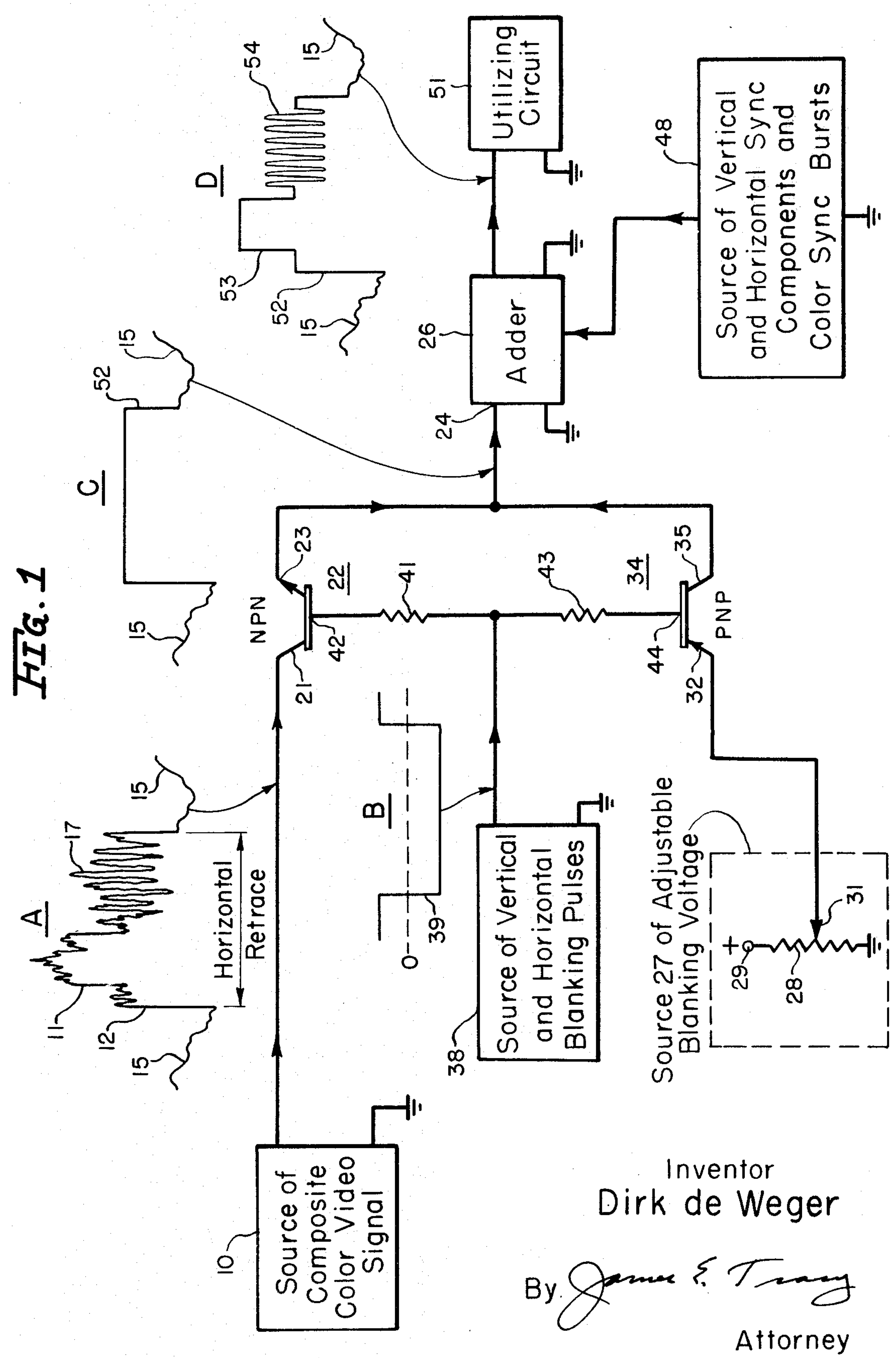

This invention pertains to a novel circuit for a television system for adding blanking pulses to a video signal while eliminating undesired signal variations that may be present in the signal during its retrace intervals. The processing circuit lends itself to many different uses and applications. For example, it may be employed in a restoration circuit for reconstituting a composite video signal, and will be described in such an environment. The invention is particularly useful in "cleaning up" and rebuilding the retrace intervals of a composite video signal.

Composite video signal reconstruction is desirable (and oftentimes essential) in a variety of different television systems. In one satellite type of operation, for example, a relatively remote satellite transmitter (usually unattended) retransmits over a different channel a television signal received over the air from a distant transmitter. The received television transmission is demodulated in the satellite to derive the composite video signal carried by the transmission, and this signal is then processed and reconstituted in a stabilizing amplifier which includes a restoration circuit to delete the original synchronizing and blanking components of the composite video signal and replace them with locally generated sync and blanking pulses. If the transmission is in color the color synchronizing bursts (superimposed on the original horizontal blanking pulses) are also removed and replaced by locally produced color bursts.

The reconstituted composite video signal is thus a cleaned up version of the received composite video signal since any undesired signal variations, such as noise components, occurring during the retrace intervals are eliminated. An RF carrier, of a frequency different from that over which the video signal was conveyed from the originating transmitter, is modulated by the reconstituted composite video signal for retransmission by the satellite station. Of course, properly shaped sync and blanking pulses, uncontaminated by noise components, are desirable to insure proper synchronization in the operation of the television receivers in the area covered or served by the satellite transmitter.

Likewise, removal and replacement of the syncs and blanks is also advantageous in a community antenna television system (called CATV) so that the composite video signal, delivered by cable to the television receivers in the system, is noise-free during its retrace intervals.

A restoration circuit may also be used in a video tape recorder to make certain that the syncs and blanks in the video signal to be recorded are not contaminated by noise.

Prior video processing circuits capable of rebuilding the retrace portions of a video signal are relatively complex, and this is especially true with respect to processing circuits for composite color video signals. One well known approach for reforming the retrace intervals of a video signal involves adding to that video signal blanking pulses of an amplitude sufficiently high to pedestal or extend any undesired signal variations into an amplitude range in the super black or blacker-than-black region and above the amplitude level (usually only slightly blacker than the black level) at which it is desired to establish the new blanking components in the reconstituted video signal. Customarily, the blanking level differs from the black level by a very small amount called "set-up." A slicer or clipper is then employed to limit the amplitude of the video signal to the desired blanking level in order to delete the undesired signal variations and provide appropriate retrace blanking pulses.

The concept of pushing the undesired components during retrace into the super black amplitude range and then slicing off everything above the blanking amplitude level to form blanking components cannot conveniently be employed in color television (as color television is practiced in the United States) since portions of the chrominance or chroma signal (namely the 3.58 megahertz subcarrier which is modulated by the color information) extend substantially into the super black region and clipping of the entire video signal at the blanking level would remove those portions of the chroma signal and thus introduce color distortion. As a consequence, previously developed processing circuits for reconstituting color video signals require relatively complicated circuit arrangements.

In sharp contrast, the video processing circuit of the present invention may be used to process either a color or a monochrome video signal and yet this may be achieved by a novel and simplified arrangement of relatively few circuit elements, an arrangement less expensive than even the previously developed processing circuits capable of functioning only with monochrome video signals. Moreover, applicant's economical processing circuit is susceptible of broad and diversified application in the field of television. It can conveniently be employed any time it is desired to provide in a video signal blanking pulses that will not be affected or contaminated by any unwanted components appearing in the video signal during the retrace intervals.

Accordingly, it is an object of the present invention to provide a new and improved video signal processing circuit for a television system.

It is another object of the invention to provide a video processing circuit which is considerably simpler and less expensive than those developed heretofore.

A video signal processing circuit, constructed in accordance with one aspect of the invention, comprises a first source of a video signal, divided into trace and retrace intervals, having desired video components varying within a predetermined amplitude range during its trace intervals and subject to the introduction of undesired signal variations during at least some of its retrace intervals. There is a second source for providing a unidirectional potential established at a selected blanking level within or without the predetermined amplitude range. A first signal translating channel is coupled between the first source and a common load circuit and this channel has a conductive state in which the video signal is applied to the load circuit and a nonconductive state in which the first source is effectively decoupled from the load circuit. A second signal translating channel, coupled between the second source and the load circuit, has a conductive state in which the unidirectional blanking potential is applied to the load circuit and a nonconductive state in which the second source is effectively decoupled from the load circuit. The processing circuit also includes means for conditioning the first and second channels to their conductive and nonconductive states respectively during the trace intervals and to their nonconductive and conductive states respectively during the retrace intervals to develop in the load circuit an output signal which is a modification of the video signal and which includes the video components during the trace intervals and blanking components, at the selected blanking level, during the retrace intervals while eliminating the undesired signal variations.

Figures 2, 3:
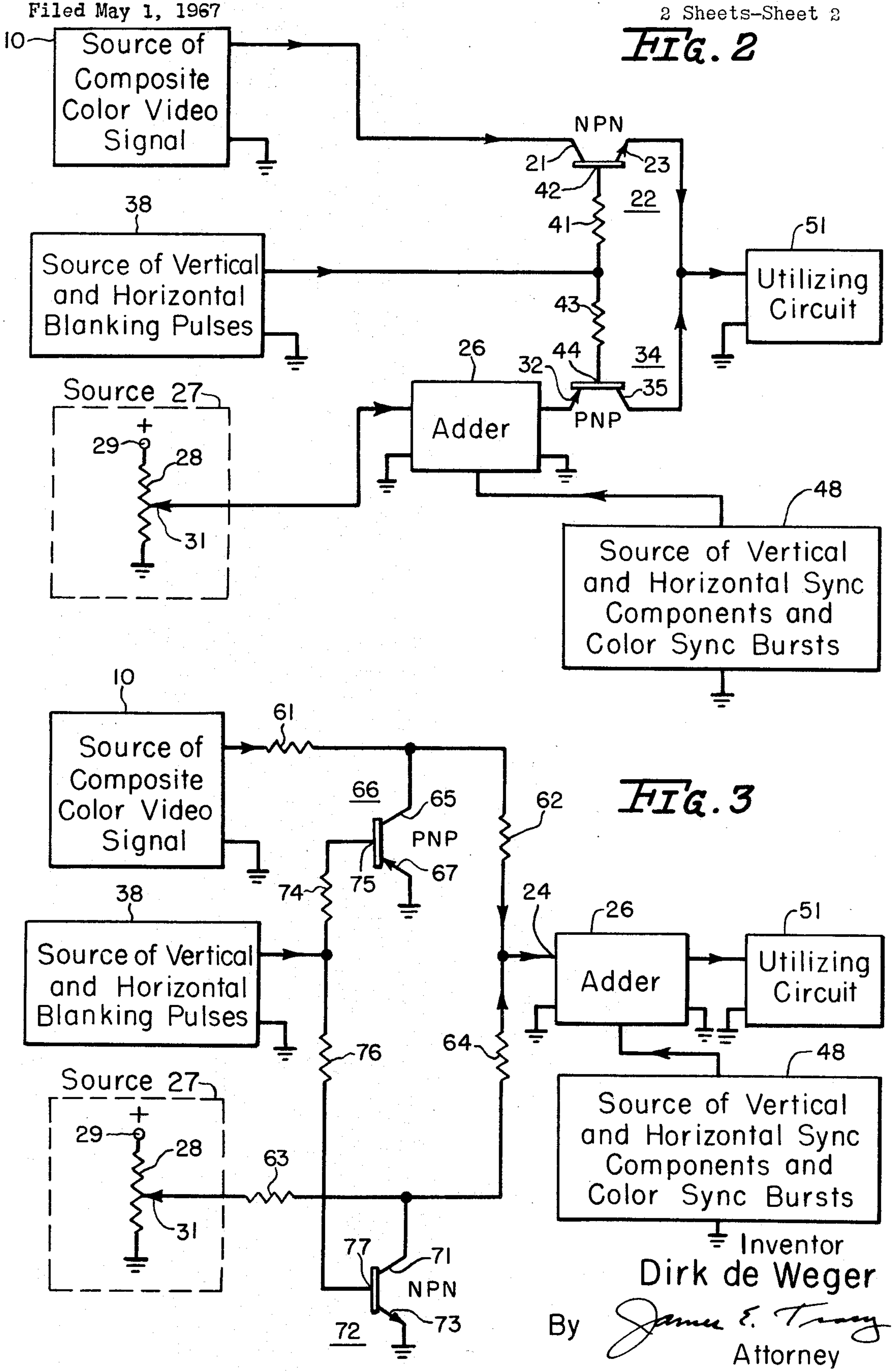

The features of this invention which are believed to be new are set forth with particularity in the appended claims. The invention, together with further objects and advantages thereof, may best be understood, however, by reference to the following description in conjunction with the accompanying drawing, in the figures of which like reference numerals identify like elements, and in which:

FIG. 1 is a schematic representation of a video processing circuit, specifically a composite color video signal restoration circuit, constructed in accordance with one embodiment of the invention; and FIGS. 2 and 3 are schematic representations of two different modifications of the restoration circuit of FIG. 1 and illustrate two additional embodiments of the invention.

Each of the three embodiments of FIGS. 1, 2 and 3 illustrate the invention as it may be incorporated in either a satellite transmitter, a video tape recorder, a community antenna television system, or for that matter in any television system where it is desired to clean up an incoming composite video signal. More particularly, the three embodiments show the manner in which noise-contaminated retrace portions of a composite color video signal may be rebuilt.

Turning now to a description of the embodiment of FIG. 1, block 10 represents a source of composite color video signal. In a satellite transmitter or CATV system, block 10 may be a video detector or demodulator. If the restoration circuit of FIG. 1 is employed in a video tape recorder unit 10 may merely be the input signal source of the tape recorder or an amplifying stage driven by the input signal.

A portion of a typical composite color video signal, with undesired signal variations in the form of noise during its retrace intervals, is shown in FIG. 1 by voltage waveform A which appears at the upper output terminal of source 10 with respect to its lower terminal which is connected to a plane of reference potential such as ground. A complete horizontal or line-retrace interval plus portions of the line-trace intervals immediately preceding and following the retrace time are illustrated by the composite video signal of waveform A. A horizontal synchronizing component or pulse 11 is pedestaled on a horizontal blanking pulse or component 12. Video components 15 precede and follow the illustrated retrace interval.

In accordance with the color television transmission standards in effect in the United States, a color synchronizing burst or component is pedestaled or superimposed on each horizontal blanking pulse during the back porch period of the pulse, namely in the time interval between the termination of the accompanying horizontal sync pulse and the termination of the horizontal blank. Specifically, each color sync burst includes several cycles of a sinusoidal shaped signal having a frequency of 3.58 megahertz. The color bursts are employed in a receiver to synchronize the operation of an oscillator which in turn controls a color demodulator to extract the color information carried by the 3.58 megahertz subcarrier (or chroma) of the composite color video signal. A color synchronizing burst 17 is illustrated in waveform A. Its representation is a substantial departure from a pure sine wave since as shown it is contaminated by undesired noise components, as is also the case with sync pulse 11 and blanking pulse 12. It is these noise components which will be deleted in the process of reforming and restoring the vertical synchronizing, horizontal synchronizing, blanking and color synchronizing components of the composite video sigal provided by source 10.

Preferably, source 10 is a relatively low impedance voltage source, for example an emiter follower. The upper output terminal of the signal source is connected to the collector 21 of a junction type switching transistor 22 of NPN gender, the emiter 23 of which is connected to upper input terminal 24 of a load circuit in the form of an adder 26, the associated lower input terminal of which is grounded. A source 27 of adjustable blanking voltage includes a potentiometer 28 which is connected between ground and the positive terminal 29 of a source of D.C. or unidirectional potential. The adjustable tap or slider 31 (which constitutes the output of source 27) of the potentiometer is connected to the emitter 32 of a junction type switching transistor 34 of the PNP variety, collector 35 of which is connected to input terminal 24 of load circuit 26. Adder 26 thus provides a common load circuit for the two transistors. The total resistance of potentiometer 28 is preferably low so that source 27 provides a relatively low impedance voltage source.

Transistor 22 effectively constitutes a series On-Off switch for controlling the coupling (or signal translating channel) between source 10 and load circuit 26, whereas transistor 34 serves as a series On-Off switch for controlling the signal translating channel between blanking potential source 27 and load circuit 26. Each of transistors 22, 34 is turned ON (driven into its saturated or conductive condition) and OFF (rendered nonconductive or cut-off) by means of an alternating switching signal developed by a source 38, which is specifically a pulse signal source that generates negative polarity pulses of the same duration and in exact time coincidence with the vertical and horizontal blanking pedestals included in the composite video signal produced by source 10. This is most conveniently accomplished by separating the sync pulses from the composite video signal and utilizing them to synchronize the operation of source 38. Voltage waveform B appears at the upper output terminal of source 38, relative to its lower terminal which is grounded, and illustrates a single negative-going horizontal blanking pulse 39 which is of the same duration as horizontal blanking pulse 12 shown in waveform A. Pulses 39 and 12 will be in precise time coincidence.

The switching signal developed by source 38 is applied to transistors 22 and 34 in a manner to turn them ON in alternation—when one of the transistors is conductive the other is cut-off, and vice-versa. Since the transistors are of opposite gender, this may be achieved merely by connecting the same output terminal of source 38 to the control terminals or bases of the transistors. More particularly, the upper terminal of source 38 is connected through an isolating resistor 41 to the base 42 of transistor 22, and through an isolating resistor 43 to the base 44 of transistor 34. Of course, if the transistors are of like gender, a pair of opposite polarity switching signals could be provided by source 38 instead of the single-ended output shown in FIG. 1.

Adder or load circuit 26 reconstitutes a noiseless version of the composite color signal produced by source 10. A source 48 of locally generated vertical and horizontal synchronizing components and color synchronizing bursts is therefore coupled to another input of the adder. For convenience, the operation of generator 48 may be geared to or synchronized by the sync pulses and color bursts of the composite video signal of source 10. The output of adder 26 may be coupled to any utilizing circuit, shown by block 51, as determined by the particular purpose to be served by the video signal restorer. For example, if the illustrated restorer is incorporated in a satellite transmitting station, circuit 51 would include a remodulator for remodulating the reconstituted composite video signal onto an RF carrier. On the other hand, when the invention is employed in a video tape recorder, utilizing circuit 51 would include the recording head since it is the reconstituted signal that is to be recorded.

Consideration will now be given to the operation of the restoration circuit of FIG. 1. Potentiometer 28 must initially be adjusted to provide at tap 31 a D.C. potential which represents the desired amplitude level for the blanking components to be introduced into the reconstituted composite video signal. Preferably, the selected blanking level will equal that of the blanking pulses in the composite video signal provided by source 10. In the ilustrated FIG. 1 embodiment, source 10 is constructed so that the entire amplitude range, over which the composite video signal varies, is positive with respect to ground and also with respect to any D.C. voltage on input terminal 24. Source 27 is of such magnitude that tap 31 is always positive relative to the D.C. voltage on terminal 24. Source 38 is constructed so that its ungrounded output terminal is positive, during each trace interval, with respect to terminal 24 and negative with respect to terminal 24 during each retrace interval.

Hence, during each horizontal-trace interval source 38 applies a positive potential to base 42 to forward bias the base-emitter junction of transistor 22 sufficiently to drive the transistor into saturation and permit the flow of collector current in the direction from collector 21 to emitter 23. The signal translating channel from source 10 to load circuit 26 will be conditioned in its conductive state during the horizontal-trace intervals, thereby applying the composite video signal to the load circuit. The video components 15 are thus supplied to the input of load circuit 26 as illustrated by voltage waveform C which appears between terminal 24 and ground. The positive output potential of source 38 during trace intervals will be of greater magnitude than the positive potential of source 27 in order to reverse bias the base-emitter junction of transistor 34 (base 44 thereby being positive with respect to emitter 32) with the result that the transistor is established in cutoff or nonconductive condition. The signal translating channel between blanking potential source 27 and load circuit 26 is thus conditioned to its nonconductive state during the trace intervals to effectively decouple source 27 from the load circuit.

During each retrace interval, on the other hand, source 10 is effectively decoupled from load circuit 26 while at the same time blanking voltage source 27 is coupled to the input of the load circuit. During retrace, source 38 applies a negative polarity pulse to both base 42 and base 44 to reverse bias and forward bias transistors 22 and 34 respectively. Transistor 22 thus becomes cut off while transistor 34 becomes saturated, thus permitting collector current in the direction from emitter 32 to collector 35. The input of load circuit 26 is consequently established at the unidirectional potential of source 27 during each retrace interval as shown by blanking component 52 in voltage waveform C which shows a portion of the output signal developed in the input of the load circuit. The output signal is a modification of the video signal provided by source 10 and includes the video components during the trace intervals and blanking components, at the blanking level selected by potentiometer 28, during the retrace intervals while at the same time the undesired noise components are deleted.

Appropriately shaped synchronizing pulses and color bursts are inserted in the output signal of curve C by source 48. A reconstituted version of the composite video signal of source 10 is thus produced at the output of adder 26, with only the desired signal components being reconstituted during retrace. Voltage waveform D thus appears at the output of adder 26. Its video components 15 are relatively unchanged from their counterparts in waveform A but blanking pulse 12, horizontal sync 11, and color burst 17 have been replaced by noise-free, perfectly shaped components 52, 53 and 54 respectively.

It is thus apparent that the processing circuit of the invention is capable of cleaning up a video signal and yet this is achieved by a relatively simplified arrangement. A salient feature resides in removing or "chopping" the video signal during its retrace portions while at the same time, and in essentially the same operation, establishing those retrace portions at any selected blanking level. Moreover, selecting between the two signal translating channels does not result in any significant switching spikes or transients in the output signal.

Of course, it is not necessary that the output signal of the video processing circuit constitute a composite video signal. It may merely comprise video components and retrace blanks. An output signal of that makeup finds utility, among other places, in some transmitter studio equipment. In that environment of the invention there will be no need to add sync pulses to the blanks. Moreover, even in those cases where syncs are inserted, this may not be accomplished until several stages later and at some point in the system entirely remote from applicant's video processing circuit.

It should also be appreciated that the video signal applied to the input of the processing circuit does not have to constitute a composite color video signal and in fact need not even be a composite video signal. For example, it may merely be a video signal developed by a television camera; there would be no syncs or blanks in such a camera signal.

The undesired signal variations to be deleted may take any form; they do not have to be noise components. For example, it may be necessary to eliminate the horizontal synchronizing pulses themselves when they are improperly timed with respect to the video information in a composite video signal. Such is the case in one particular subscription television system in which the video processing circuit may be advantageously employed. In that system, the television signal is scrambled or coded in the transmitter by varying the time relation of the video and synchronizing components of the radiated television signal to cause an unauthorized receiver to produce a scrambled image. portions of which shift or "jitter" laterally with respect to each other on the picture tube screen. Such a system is shown in several patents—see, for example, Pat. 3,244,806, which issued Apr. 5, 1966 in the name of George V. Morris, and is assigned to the present assignee. As described in the Morris patent, jitter-type coding of the video signal may be achieved at the transmitter by interposing a delay line (which introduces a time delay $\Delta t$ equal to a very small portion of a line-trace interval) in the video channel during randomly selected horizontal lines of video information. Periodically recurring vertical and horizontal synchronizing components and blanking pulses are then added to the coded video signal. Each horizontal trace of the coded composite video signal transmitted to the receivers is thus established in either a delayed mode or an undelayed mode.

Appropriate decoding apparatus, for use in the receiver to decode the jittered video signal, is also decribed in the Morris patent. In short, the apparatus operates in precise step or synchronism with the transmitter coding equipment and in complementary fashion in order to delay by duration $\Delta t$ those lines of video information not delayed at the transmitter, while permitting the delayed lines of the received video signal to be translated through the receiver video channel without introducing any delay. In other words, when there is a time delay $\Delta t$ between the occurrence of a radiated line-sync pulse and the video information occurring during the immediately succeeding horizontal-trace interval, that line of video information is translated through the decoding apparatus with no delay, whereas when there is no delay introduced at the transmitter a delay $\Delta t$ is imparted to the video signal in the decoder. In this way, each horizontal trace of video information is delayed for interval $\Delta t$ once, but no more than once, at either the transmitter or receiver.

When a conventioned television receiver is to be modified or adapted to effect decoding of a jittered video signal, it is most desirable (particularly from an economical standpoint) to construct the decoding equipment as a so-called "front end" or RF decoder so that only one connection need be made to the television receiver and that connection should be to its antenna input terminals. The signal fed to the television set should therefore take the form of a conventional uncoded television transmission as would be received from any nonsubscription television transmitter. This means that the decoder itself must demodulate the received coded television transmission to develop the coded composite video signal which is then unscrambled or unjittered. The decoded video signal must be remodulated on an RF carrier for application to the antenna input terminals. However, since the horizontal sync pulses and blanks appear periodically, with equal time spacing or separation between successive pulses and blanks, in the coded composite video signal, the decoding process will alter the timing of those components with the result that they appear jittered in the decoded video signal. In other words, the horizontal synchronizing and blanking pulses will be aperiodically recurring with different time separations existing between some of the pairs of successive horizontal syncs and blanks. Of course, the decoded composite video signal remodulated on an RF carrier and delivered to the antenna input terminals must include periodically rather than aperiodically recurring syncs and blanking pedestals.

The video processing circuit of FIG. 1 may be incorporated in the described decoding equipment to delete the jittered horizontal syncs and blanks and replace them with periodically recurring synchronizing and blanking pulses. Source 10 would thus include all of the necessary decoding circuitry (shown in detail in the Morris patent) required to convert a received coded television signal into a decoded composite, video signal, the sync and blanking pulses of which manifest as aperiodically recurring components. Preferably, the new horizontal blanks will be wider than the original ones; specifically, each will have a duration equal to the original blanking pulse width plus the time delay $\Delta t$. Utilizing circuit 51 would include the remodulating circuitry.

The flexibility of the video processing circuit, with respect to the adjustability of the amplitude level of the blanking components introduced by voltage source 27, permits the invention to serve still other useful purposes. The D.C. voltage provided at tap 31 may be of such magnitude and polarity that the reconstituted blanking components will be 180° out of phase with the blanking pedestals of the original composite video signal. In other words, blanking voltage source 27 would effectively introduce negative-going or negative-polarity blanking pulses rather than the positive polarity pulses illustrated. Source 48 could also be modified to introduce negative-going sync pulses.

Reversing the phase of the syncs and blanks while maintaining the video components in phase also finds useful application, among other places, in the field of subscription television. To achieve maximum picture scrambling, and thus minimize intelligibility, it is helpful to modulate the video components on its RF carrier at the transmitter with black and white inverted so that a negative pciture (which may be likened to a photographic negative) is produced on the picture tube screen of a nonsubscriber's receiver. In other words, while picture information is represented by a video component established at a level close to the blanking level. Such a black-to-white picture inversion coding technique may be combined with a variety of other coding schemes to compound the scrambling complexity. If it is combined with the jitter coding technique, the front end decoder may be modified so that the reconstituted sync and blanking pulses, in the composite video signal applied to the remodulator, are reversed in phase relative to the syncs and blanks of the coded video signal. This may conveniently be achieved by the circuit of FIG. 1 by changing the level of the blanking potential of source 27 and the polarity of the sync pulses introduced by source 48.

In a still further application of the invention in the field of subscription television, the level of the blanking components introduced by source 27 may be adjusted to be representative of gray picture information. The circuit of FIG. 1 may be used in the transmitter to insert what are known as "jittered blanks" (established at gray level) useful in equalizing the picture content between the delayed and undelayed modes of operation in a jitter coding system to avoid flicker that may otherwise develop on the screen of a subscriber's receiver even though the television signal is being properly decoded.

The embodiment of FIG. 2 illustrates that the reconstituted synch and color bursts may be combined with the blanking potential from source 27 and the entire combination can be applied to utilizing circuit 51 under the control of switching transistor 34. The output of adder 26 thus provides sync pulses and color bursts superimposed or pedestaled on a D.C. voltage provided by source 27. In this arrangement, circuit 51 provides the common load circuit for the two signal translating channels.

Since the two transistors in FIG. 1 serve as series switches, each of the two signal translating channels is in its conductive state when its associated transistor is turned ON. In the embodiment of FIG. 3, the switching transistors are connected as shunt or parallel switches in their associated channels and each channel is conductive when its transistor is OFF. In FIG. 3, the upper terminal of source 10 is coupled through a pair of series-connected isolating resistors 61 and 62 to input terminal 24 of adder 26. Adjustable tap 31 is similarly coupled via a pair of series-connected isolating resistors 63 and 64 to terminal 24. The junction of resistors 61 and 62 is connected to the collector 65 of a junction type switching transistor 66 of PNP gender, the emitter 67 of which is grounded. The junction of resistors 63 and 64 is coupled to the collector 71 of a junction type switching transistor 72 of the NPN variety, its emitter 73 being connected to ground. The upper output terminal of source 38 is connected through an isolating resistor 74 to base 75 of transistor 66 and through an isolating resistor 76 to base 77 of transistor 72.

During trace intervals the positive output voltage of source 38 cuts transistor 66 OFF and at the same time turns transistor 72 ON. During the intervening retrace intervals, at which time a negative output voltage is developed by source 38, transistor 66 is rendered conductive while transistor 72 is turned OFF. Hence, during trace the video signal of source 10 is applied via resistors 61 and 62 to the input of load circuit 26 while at the same time the blanking voltage of source 27 is preventeed from reaching the load circuit by virtue of the conduction of transistor 72. The junction of resistors 63 and 64 will be essentially grounded and the blanking voltage will be dropped substantially across resistor 63. During retrace, on the other hand, transistor 66 is ON thereby shorting the junction of resistors 61 and 62 to ground so that the video signal is prevented from reaching adder 26. Transistor 72 is, however, in its OF condition at that time and this permits the blanking potential to be applied to load circuit 26.

The invention provides, therefore, an improved video processing circuit which features a pair of signal translating channels rendered conductive in alternation to apply to a common load circuit the video components of a video signal during trace intervals and a blanking voltage during retrace intervals.

While particular embodiments of the invention have been shown and described, modifications may be made and it is intended in the appended claims to cover all such modifications as may fall within the true spirit and scope of the invention.

I claim:

1. A video signal processing circuit for a television system, comprising:

a first source of a video signal, divided into trace and retrace intervals, having desired video components varying within a predetermined amplitude range during its trace intervals and subject to the introduction of undesired signal variations during at least some of its retrace intervals;

a second source for providing a unidirectional potential established at a selected blanking level within or without said predetermined amplitude range;

a common load circuit;

a first signal translating channel, coupled between said first source and said load circuit, having a conductive state in which said video signal is applied to said load circuit and a nonconductive state in which said first source is effectively decoupled from said load circuit;

a second signal translating channel, coupled between said second source and said load circuit, having a conductive state in which said unidirectional blanking potential is applied to said load circuit and a nonconductive state in which said second source is effectively decoupled from said load circuit;

and means for conditioning said first and second channels to their conductive and nonconductive states respectively during said trace intervals and to their nonconductive and conductive states respectively during said retrace intervals to develop in said load circuit an output signal which is a modification of said video signal and which includes said video components during said trace intervals and blanking components, at said selected blanking level, during said retrace intervals while eliminating said undesired signal variations.

2. A video signal processing circuit according to claim 1 and including means coupled to said load circuit for inserting synchronizing components in said output signal thereby to provide a composite video signal.

3. A video signal processing circuit according to claim 1 in which said video signal is a composite color video signal having during its retrace intervals vertical synchronizing, horizontal synchronizing, blanking and color synchronizing components.

4. A video signal processing circuit according to claim 1 in which said video signal is a composite video signal having synchronizing and blanking components during its retrace intervals, and including means for supplying synchronizing components to said load circuit in order that said output signal reconstitutes said composite video signal.

5. A video signal processing circuit according to claim 4 in which the video components of said output signal are in phase with the video components of said composite video signal while the reconstituted blanking and synchronizing components of said output signal are effectively 180° out of phase with the blanking and synchronizing components of said composite video signal.

6. A video signal processing circuit according to claim 1 in which the undesired signal variations include noise components.

7. A video signal processing circuit according to claim 1 in which said undesired signal variations include aperiodically recurring horizontal synchronizing components with different time separations existing between some of the pairs of successive horizontal synchronizing components, and including means for introducing periodically recurring horizontal synchronizing components into said output signal.

8. A video signal processing circuit according to claim 1 in which said load circuit includes an adder one input of which is coupled to both of said first and second channels, and including a source of synchronizing components coupled to another input of said adder for inserting synchronizing components in said output signal.

9. A video signal processing circuit according to claim 1 and including a source of synchronizing components coupled, via said second translating channel, to said load circuit for introducing synchronizing components into said output signal.

10. A video signal processing circuit according to claim 1 in which said first channel includes a first switching transistor for selectively establishing said first channel in either its conductive state or nonconductive state, wherein said second channel includes a second switching transistor for selectively establishing said second channel in either its conductive state or nonconductive state, and in which said conditioning means includes a pulse signal source for applying a switching signal to both of said transistors to condition said first and second channels to their respective conductive states in alternation.

11. A video signal processing circuit according to claim 10 in which each of said transistors constitutes a series switch in the channel in which it is included.

12. A video signal processing circuit according to claim 10 in which each of said transistors constitutes a shunt switch in the channel in which it is included.

References Cited

UNITED STATES PATENTS

| | | | |
|---|---|---|---|
| 2,622,193 | 12/1952 | Clayden. | |
| 2,755,335 | 7/1956 | White | 178—7.1 |

ROBERT L. GRIFFIN, Primary Examiner

R. L. RICHARDSON, Assistant Examiner

U.S. Cl. X.R.

178—7.3